United States Patent
Ailisto et al.

(10) Patent No.: US 7,085,403 B2
(45) Date of Patent: Aug. 1, 2006

(54) AUTOMATIC FINGERPRINT IDENTIFICATION METHOD

(75) Inventors: Heikki Ailisto, Oulu (FI); Mikko Lindholm, Oulu (FI)

(73) Assignee: Nokia Corporation, Espoo (FI)

( * ) Notice: Subject to any disclaimer, the term of this patent is extended or adjusted under 35 U.S.C. 154(b) by 571 days.

(21) Appl. No.: 10/183,142

(22) Filed: Jun. 25, 2002

(65) Prior Publication Data

US 2003/0007671 A1    Jan. 9, 2003

(30) Foreign Application Priority Data

Jun. 27, 2001    (FI) ................... 20011370

(51) Int. Cl.
*G06K 9/00*    (2006.01)
(52) U.S. Cl. ..................... 382/124
(58) Field of Classification Search .............. 382/124, 382/125; 340/5.53, 5.83
See application file for complete search history.

(56) References Cited

U.S. PATENT DOCUMENTS

| | | | |
|---|---|---|---|
| 4,151,512 A | 4/1979 | Riganati et al. | 340/146.3 E |
| 5,054,089 A * | 10/1991 | Uchida et al. | 382/127 |
| 5,825,924 A * | 10/1998 | Kobayashi | 382/219 |
| 5,892,838 A | 4/1999 | Brady | 382/115 |
| 5,991,430 A | 11/1999 | Hsu et al. | 382/124 |
| 6,141,436 A * | 10/2000 | Srey et al. | 382/124 |
| 6,487,306 B1 * | 11/2002 | Jain et al. | 382/125 |

FOREIGN PATENT DOCUMENTS

| | | |
|---|---|---|
| EP | 0376663 A2 | 7/1990 |
| EP | 0623890 B1 | 11/1994 |

* cited by examiner

*Primary Examiner*—Joseph Mancuso
*Assistant Examiner*—Robert Tarcu
(74) *Attorney, Agent, or Firm*—Harrington & Smith, LLP (57) ABSTRACT

The invention relates to an automatic fingerprint identification method. In the method according to the invention, identification is executed in three phases. In coarse alignment (32), fingerprints are compared using a few reference points. In fine alignment (33), coincidence of fingerprint minutiae are used to find the best fingerprint matching transformation. In the matching phase (34), individual minutiae of the fingerprint examined are matched against a known template. Parameters are computed from the matching minutiae and used in making the final identification.

23 Claims, 6 Drawing Sheets

AUTOMATIC FINGERPRINT IDENTIFICATION METHOD

FIELD OF THE INVENTION

The invention relates to an automatic fingerprint identification method in which the fingerprint to be identified is matched against a template in memory. The invention further relates to a terminal employing the method.

BACKGROUND OF THE INVENTION

The need to identify people is ancient. Perhaps the oldest known identification method is the one based on a fingerprint of a person. Already thousands of years B.C.E. various documents were authenticated by making an impression of a finger on a seal. In the early 1900's, crime investigators begun utilizing fingerprints in their work because by that time it had been ascertained that fingerprints were unique to each person and that they do not change during the lifetime of a person. Special fingerprint matching equipment were developed in the $20^{th}$ century to optically compare fingerprints and look for matches in existing databases.

Reliable automatic identification of individuals is a growing problem. More and more often people manage their bank and other affairs using apparatus that require reliable user identification. This is usually accomplished through the use of an identification number or the like. Such identification numbers or code words may be called personal identification codes or PIN codes. With a four-digit PIN code there is one chance out of a ten thousand that an unauthorized user will accidentally find the PIN code of another person. Since there are numerous different service systems used by people, there are also a great number of different security codes needed. Remembering all those codes may be difficult, especially for older people. If, on the other hand, a person uses one and the same code in many systems, there is the risk that if a code is found out in one system, the code of the person can be illegally applied also in all other systems used by the person.

These problems have led to the development of various automatic biometric identification methods. In such methods the identification of an individual is based e.g. on the identification of a fingerprint, shape of the hand, iris or eyeground of an eye, shape of the face, voice or, in conjunction with a keyboard, the key-pressing dynamics of the user. In any automatic identification, the identification of a person is based on the use of a template where characteristics of the person in question are saved in condensed form. On the basis of a matching process, the person is either identified or not. The identification task may be "one-to-many", as in a crime case, or "one-to-one", which e.g. replaces the use of a PIN code in connection with various service automata. The latter method is usually called verification.

SUMMARY OF THE INVENTION

Figure 1A:
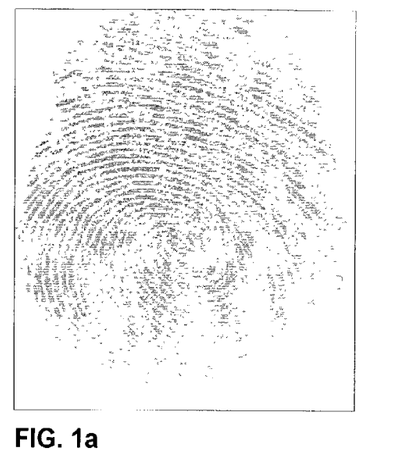
FIG. 1a shows a fingerprint record.
Figure 1B:
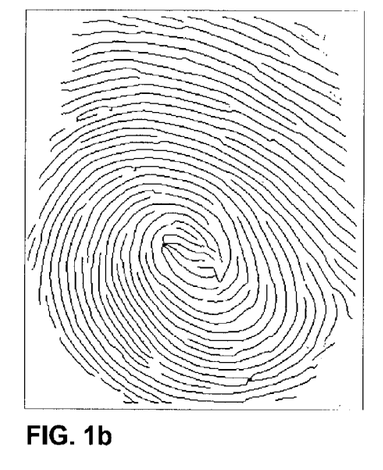
FIG. 1b shows an image file produced from the fingerprint record of FIG. 1a, FIG. 2 shows minutiae of a fingerprint.

Fingerprint-based automatic identification is still topical as an identification method. However, in spite of its simplicity it is at the same time complicated to apply. FIG. 1a shows a fingerprint as it has been recorded. Fingerprints, especially those recorded in connection with crime investigations, may be smudgy and broken, sometimes very much so. Therefore, identification should be possible even from a partial fingerprint. FIG. 1a shows also other things that make automatic identification more difficult. The elasticity of a fingertip always affects the shape and size of the fingerprint to a certain extent. Moreover, there are always some erroneous features in a fingerprint that do not belong to the true fingerprint. These are caused e.g. when the finger moves a little. Such error factors must be taken into account also in conjunction with fingerprint-based automatic identification. Indeed, automatic identification of fingerprints requires that the image file of the fingerprint under examination be processed using some method. Such a method aims to reveal the real characteristics of the fingerprint and remove from the fingerprint file the features that according to the method do not seem to belong to the fingerprint proper. FIG. 1b shows a processed image file of the fingerprint shown in FIG. 1a. The ridges in the fingerprint are depicted in thin lines forming the basic pattern of the fingerprint recorded.

Figure 2:
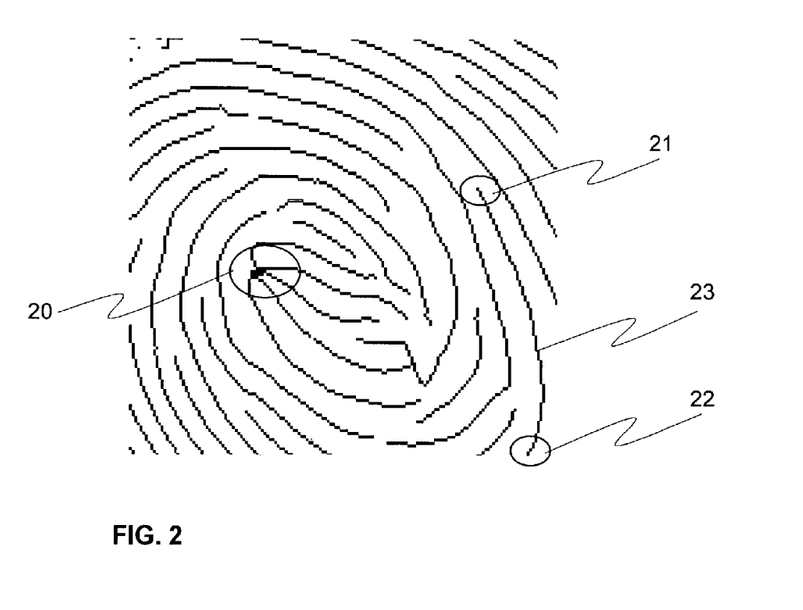

FIG. 2 shows a detail of FIG. 1b. There can be seen some minutiae of a fingerprint. Such minutiae include, among other things, ridges 23, bifurcations 20, and endings 21, 22. Identification of a fingerprint may be based on matching these minutiae against an existing template, for example. Another option is to match the ridge directions at various points in the fingerprint. However, erroneous features that appear in the fingerprint make identification more difficult. As much as possible, these erroneous features must be ascertained so that identification can be reliably accomplished. However, the analysis and removal of errors require significant computing capacity. Therefore, fingerprint-based automatic identification can be problematic in a portable apparatus with modest processing and memory capacity.

An object of this invention is to provide a novel fingerprint identification method by means of which one-to-one identification of a person can be accomplished reliably in apparatus with limited computing capacity.

The objects of the invention are achieved by a three-phase identification method which comprises a coarse alignment of the fingerprints compared, fine alignment to select the most appropriate transformation for the fingerprint compared, and a matching phase in which a decision is made about whether the transformed fingerprint is identified or not.

An automatic identification method according to the invention is characterized in that the method comprises a phase to implement coarse alignment, phase to implement fine alignment, and a phase to implement fingerprint matching in which parameters describing the matching are computed, on the basis of which a decision is made about the identification of the fingerprint.

A terminal according to the invention is characterized in that the entering of a PIN code on the terminal is replaced by a fingerprint-based identification method.

Some advantageous embodiments of the invention are presented in the dependent claims.

The idea of the invention is basically as follows: Identification of a fingerprint is carried out in a three-phase process. The first phase comprises coarse alignment of the fingerprint examined and a template stored in memory. This is done using a few reference points (minutiae) found in the compared fingerprints. The fingerprint examined is processed, without rotating it, so that the best reference point correspondence is found between the fingerprint and the template. In the next phase, fine alignment is performed. There the fingerprint examined is translated and rotated so that the minutiae and ridges of the fingerprints produce the best possible correspondence. The third phase comprises fingerprint matching where ridge-specific local translations and rotations for individual ridge pair combinations are performed. For these ridge pairs, parameters are computed to describe the accuracy of the match. These parameters are used as criteria to select the best matching ridge pair in the fingerprint and template. The parameters for the ridge pairs identified in the fingerprints are used to produce parameters representing the overall identification of the fingerprint which are used in making the decision as to whether or not the fingerprint has been identified.

An advantage of the identification method according to the invention is that it does not require complicated transformation and computation algorithms, whereby it can be utilized in an apparatus with a limited computing and memory capacity.

BRIEF DESCRIPTION OF THE DRAWINGS

The invention is described more closely below. The description refers to the accompanying drawings in which.

DETAILED DESCRIPTION OF THE INVENTION

FIGS. 1a, 1b and 2 were already discussed in connection with the description of the prior art.

Figure 3A:
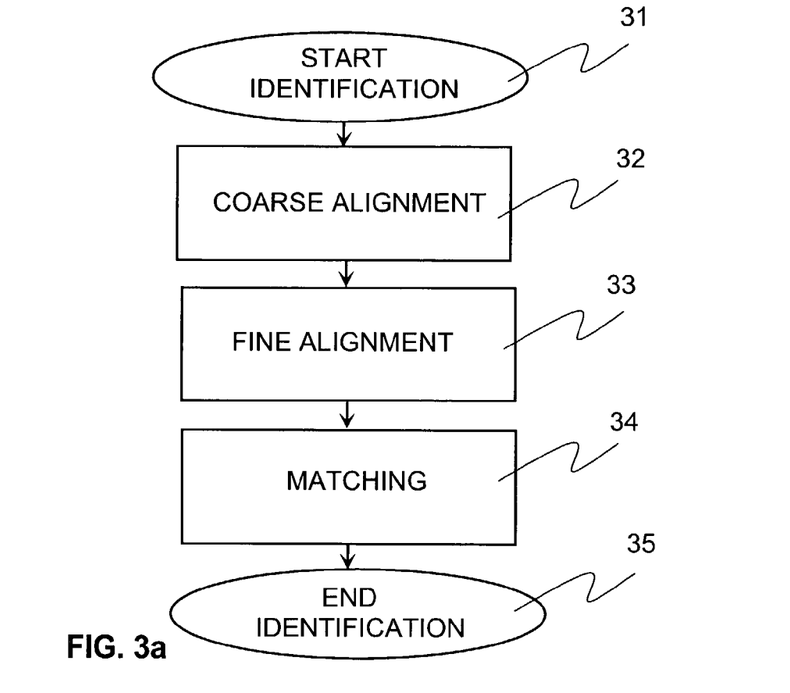
FIG. 3a shows as an example a flow diagram of the three main phases of the method according to the invention.

FIG. 3a shows as an example a flow diagram of the three main phases of the method according to the invention. The figure depicts a situation involving an automatic one-to-one identification, i.e. verification of a person's identity. The fingerprint identification process proper starts at step 31. Step 32 involves coarse alignment of the fingerprint to be identified and a template of a certain person's fingerprint stored in memory. The fingerprint to be identified is translated in such a manner that the fingerprints compared can be aligned using a few (4 to 5) "reference points" found in the fingerprint.

Fine alignment 33 involves the use of ridges 23, bifurcations 20 and endings 21, 22 found in the fingerprints. In this phase, the method attempts to match several compatible-looking minutiae. During each individual matching attempt it is possible to employ translation and rotation of the whole fingerprint examined. When all comparisons of the minutiae pairs have been completed, the transformation that produced the highest number of minutiae matches is selected.

In the matching phase 34, individual ridge pairs are compared between the fingerprint examined and the template fingerprint. In this phase, ridge-specific transformations and ridge rotations are allowed. For each matching attempt, a parameter is computed to describe the accuracy of the matching of the ridge pair in question. When all ridge matching attempts have been completed, all individual parameters for the ridges are used to calculate a parameter representing the whole fingerprint matching on the basis of which a decision is made as to whether or not the fingerprint has been identified. Following the decision the identification process ends at step 35.

Figure 3B:
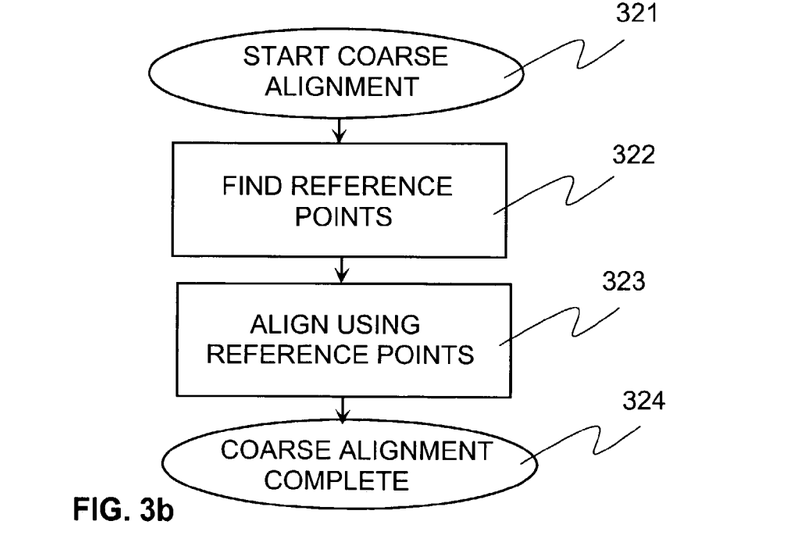
FIG. 3b shows as an example a flow diagram of the steps of the coarse alignment phase according to the invention.

FIG. 3b shows the steps of the coarse alignment phase 32 according to the invention. Fingerprint identification starts at step 321 and coarse alignment is begun. Coarse alignment is accomplished using a few "reference points" found in both fingerprints. These reference points can be found using e.g. the Local Orientation Change Circular Sum (LOCCS) method, step 322. Also other existing prior-art methods can be used. The reference points in the fingerprint image examined are compared with the corresponding minutiae in the template. The shape of the fingerprint examined may be altered such that the reference points of the fingerprints coincide, step 323. However, it should be noted that in this transformation the fingerprint examined is not rotated. Moreover, the reference points need not completely correspond in the two fingerprint patterns compared. In the method according to the invention it suffices that the reference points compared are located within 40 to 50 pixels from each other in the fingerprint images compared, assuming an overall fingerprint image size of about 500×500 pixels. Coarse alignment ends at step 324.

Figure 3C:
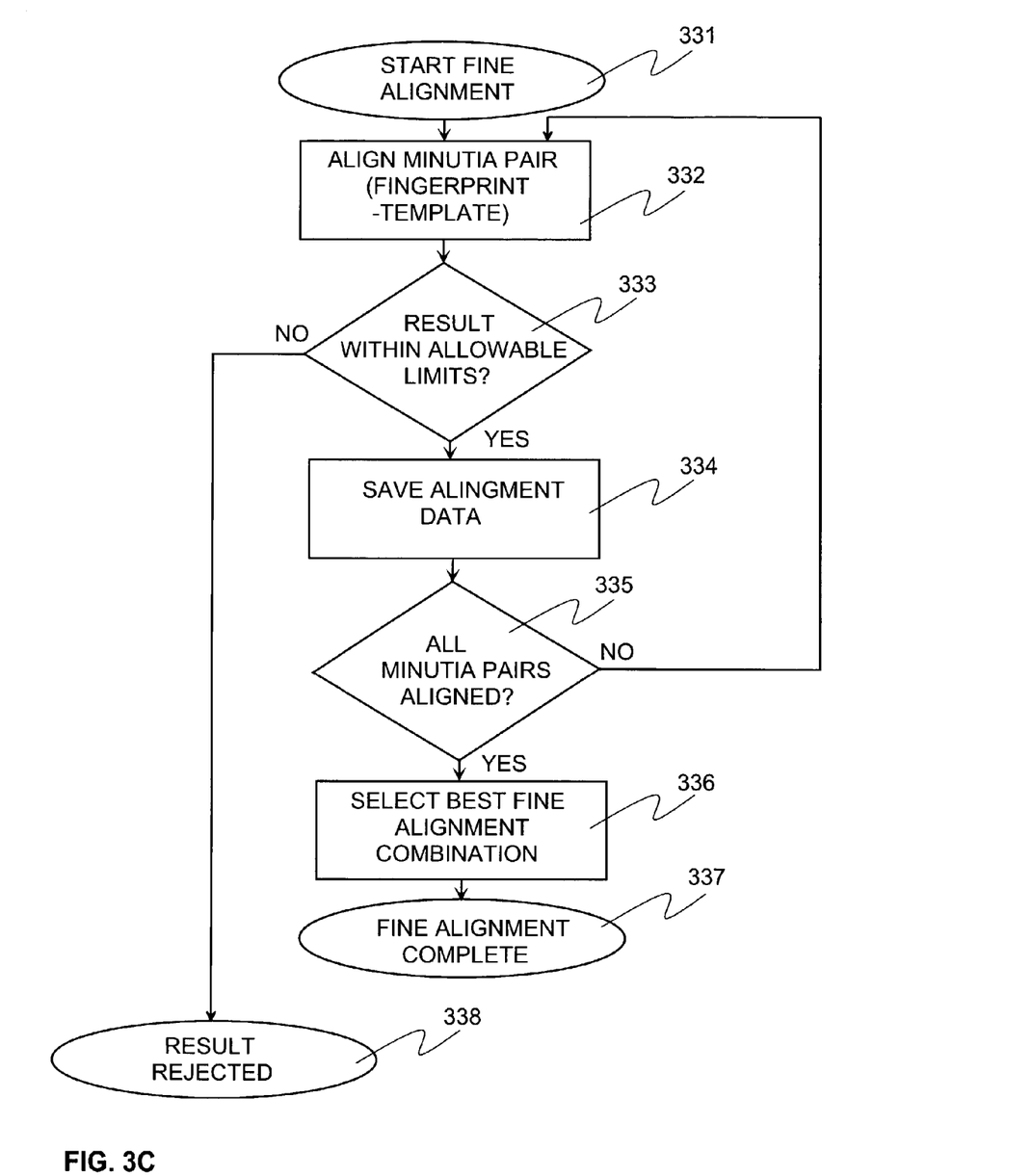
FIG. 3c shows as an example a flow diagram of the steps of the fine alignment phase according to the invention, FIGS. 3d,e show as an example a flow diagram of the steps of the matching phase according to the invention.

FIG. 3c shows the steps of the fine alignment process according to the invention. Fine alignment starts at step 331. In step 332 the minutia pairs found in the fingerprints) are compared pair by pair. This involves the comparison of locations of endings and lengths of ridges in the fingerprints compared. The ridges compared need not completely match one another. The ridges are considered to match when the location of an ending of either ridge differs e.g. less than 50 pixels from its pair. Likewise, the lengths of the ridges matched may differ by ±10 pixels or ±10% of the ridge length as long as the shape of the ridge essentially corresponds to the ridge in the template. The shapes of the ridges are considered similar when fractions ¼, ½ and ¾ of the ridge length are located at a distance of ±(0.6×(10 pixels+ 10% of ridge length)) from each other. For each ridge-specific comparison the size of the fingerprint image examined is translated with respect to the template. The fingerprint pattern examined may be rotated as well. On the basis of the criteria described above a test is carried out in step 333. If the test yields a negative result, the fine alignment attempt in question will not be used any more, step 338. If, however, the test gives a positive result, the transformation, i.e. translation and rotation, data of the fingerprint used in that fine alignment attempt are stored in step 334 for later use.

In step 335 it is verified that all possible minutia pairs between the fingerprint patterns compared have been tested. If there are minutia pairs still untested, the process goes back to step 332 and continues with an untested minutia pair. If, however, all possible fine alignment attempts have been made, the process moves on to step 336 where it is selected the best translation-rotation combination used in the fine alignment process. The best combination is found by searching for the translation-rotation combination that produced the highest number of matching minutia pairs between the two fingerprint patterns compared. The data of this combination are saved for the matching phase. When the selection has been done, the process moves on to step 337 in which the fine alignment is complete.

Figure 3D:
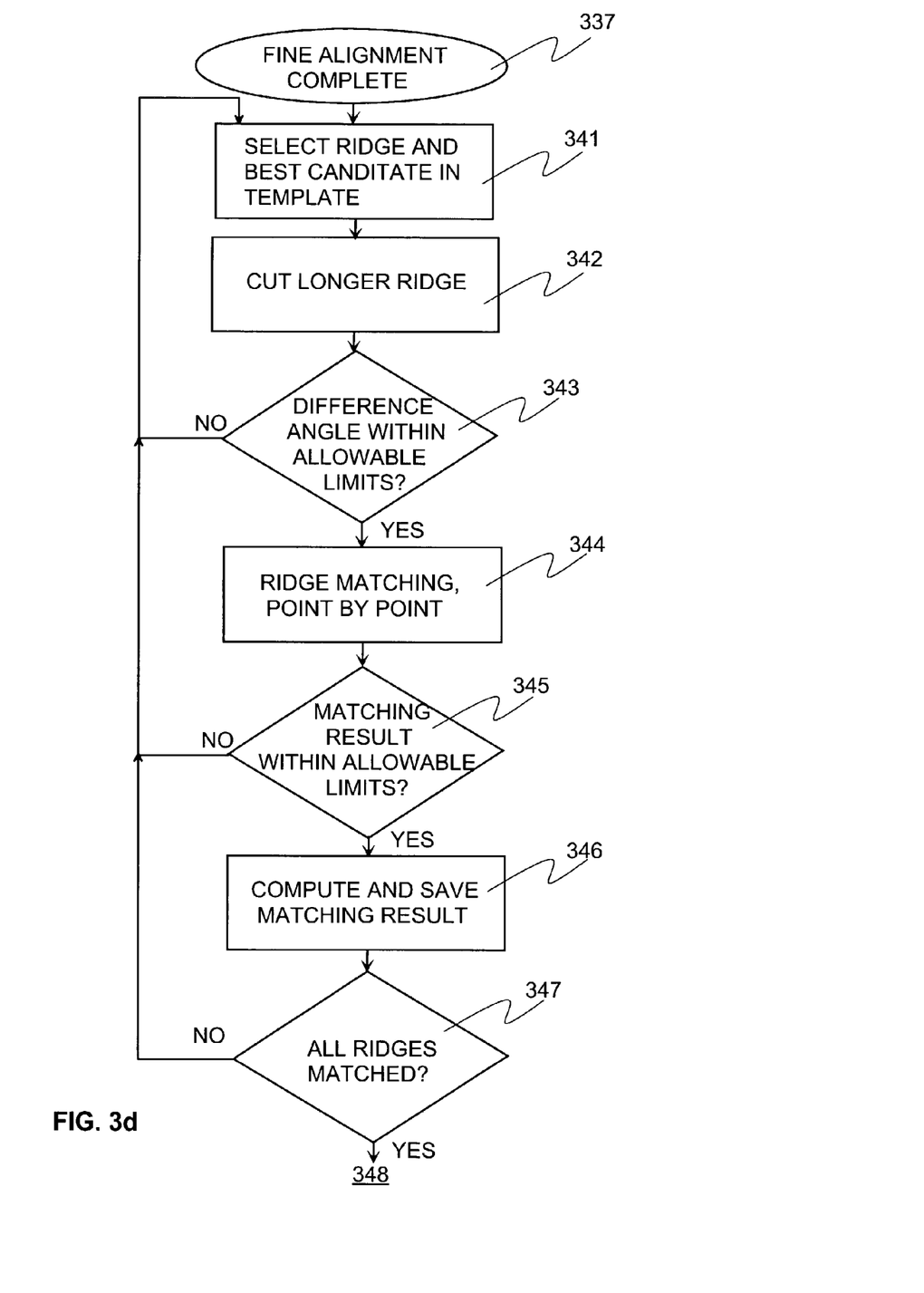
Figure 3E:
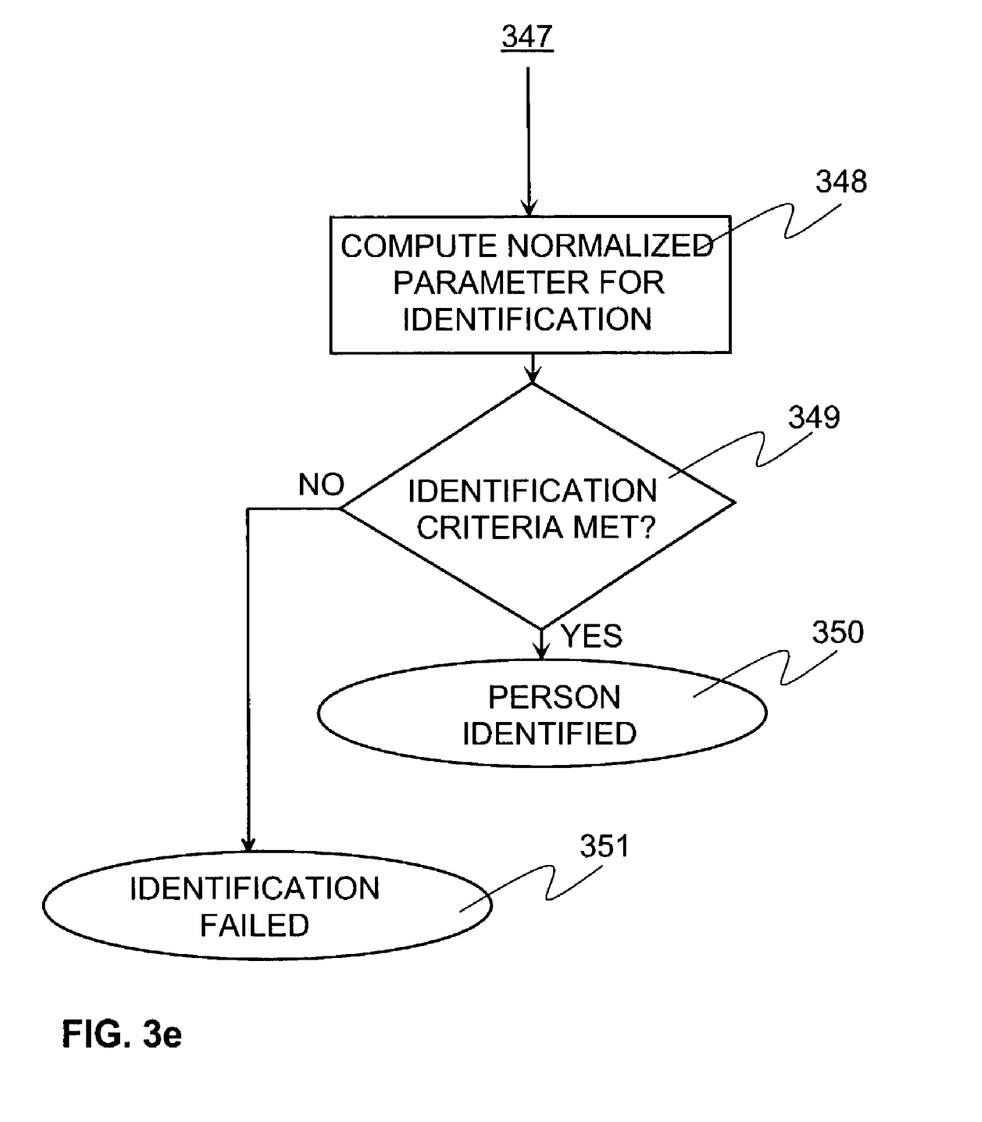
Figure 4A:
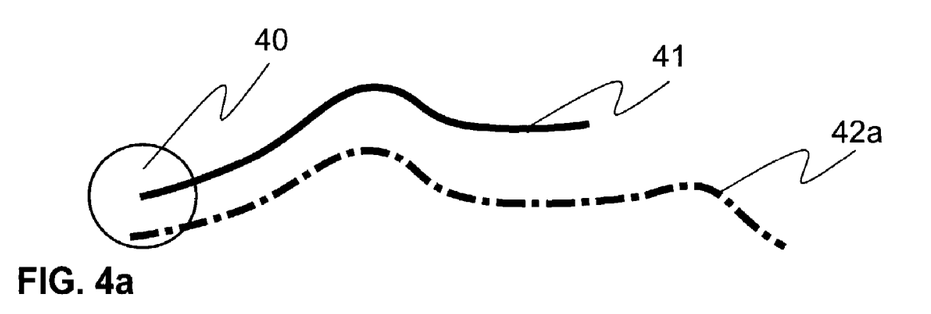
FIG. 4a shows as an example two unprocessed ridges to be compared.

FIGS. 3d and 3e show the steps of the matching phase according to the invention for the fingerprints to be compared. At the end of the fine alignment phase 337 it was found the best translation-rotation combination for the fingerprint examined. This translation-rotation combination is used for processing the fingerprint as a whole. In step 341 the endings of the ridges in the fingerprints are matched against each other. This matching involves the use comparison techniques already employed in the fine alignment phase. The locations of the ridge endings in the fingerprints compared are considered to coincide when their locations in the fingerprints differ by less than 25 pixels. The example depicted in FIG. 4a shows a ridge pair 41 and 42a and the location of one coincident ending in the area according to the criterion, reference number 40. If one of the endings of the ridge pair examined meets this criterion, the ridge pair is examined more closely. If the above-mentioned condition is not met, the ridge in the fingerprint examined is matched against some other ridge found in the template.

In step 342 the longer one of the ridge pair examined it is first shortened so that the lengths of the ridges become equal. In the example depicted in FIG. 4b ridge 42b has been cut shorter so that its length equals that of ridge 41. Originally the length of ridge 42b equaled that of ridge 42a in FIG. 4a. Shortening may be performed on the ridge in the template or the ridge in the fingerprint examined. The shortened ridge 42b may be rotated and relocated for better alignment with ridge 41. A maximum value of 0.1 radian is, however, defined for the rotation and must not be exceeded in the method according to the invention. Step 343 tests whether or not this rotation condition is met. If the condition is not met in step 343, then the ridge examined will be matched against some other ridge found in the template, i.e. the process returns to step 341.

Figure 4B:
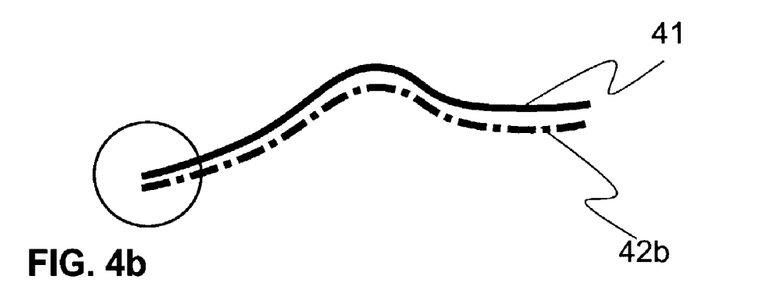
FIG. 4b shows as an example processed ridges used in the method according to the invention.
Figure 4C:
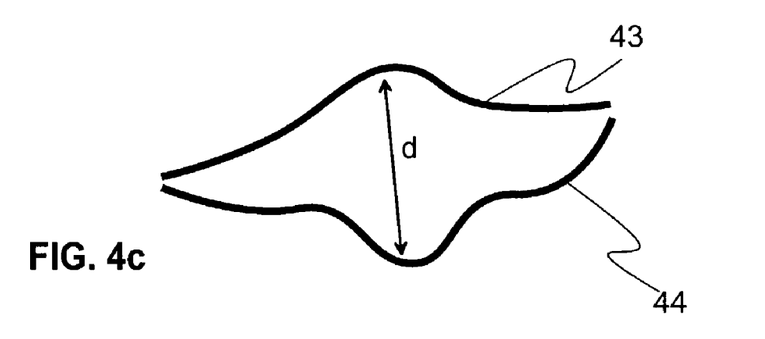
FIG. 4c shows as an example a classification method for minutiae in the method according to the invention.

If the test 343 yields a positive result, the process moves on to step 344 in which the points in the ridges in the fingerprints are matched against each other. Prior to this matching, the fingerprint or template has been transformed (cut), translated and rotated in accordance with the conditions mentioned above in order to achieve the best possible correspondence between the ridges. FIG. 4c shows as an example a situation in which there has been measured a distance d between corresponding points in ridges 43, 44. This distance d should meet the following condition: distance d shall be smaller than 10 pixels+5% of the ridge length. This condition is tested in step 345. If the condition is met, the ridge pair is considered matching. After that, the ridge pair is marked matched in both fingerprints in order to prevent erroneous double identification. When an identified ridge pair has been accepted, the value of an identification counter according to the invention is incremented by one. If the test condition is not met, the process returns to step 341 and starts an attempt to match another ridge against some other ridge found in the template.

When, in step 345, a ridge pair has been accepted as an identified ridge pair, then advantageously in addition to incrementing the identification counter, the following parameters describing the accuracy of the identification are computed: total sum ($\Sigma d$) of distances between corresponding points in ridges 41, 42b, the length of coincident ridge, and the weighted length, i.e. the squared length of coincident ridge divided by the total sum ($\Sigma d$) of the distances of the corresponding points. These parameters are saved for later use.

Step 347 cheeks whether all possible ridge pairs have been tested. If not, the process again returns to step 341. If all possible ridge pairs have been tested, the process moves on to step 348 depicted in FIG. 3e.

In step 348 some parameters describing the whole fingerprint identification process are computed. Such parameters advantageously include:

normalized identification counter value, meaning the number of coincident ridges 41, 42b identified in the fingerprints, divided by the mean of all ridges found in both fingerprints (total sum of minutiae found in both fingerprints divided by two), normalized total length of coincident ridge, meaning twice the sum of the lengths of all coincident ridges divided by the sum total length of all ridges found in both fingerprints, normalized weighted length, meaning the sum of the weighted lengths of accepted ridges divided by the sum total length of all ridges found in both fingerprints, and average distance of corresponding points measured for ridge pairs, which is obtained by dividing the sum of all measured distances by the sum total length of the ridges found in both fingerprints.

The parameters mentioned above are used in step 349 for making the fingerprint identification decision. The identification decision is advantageously made on the basis of threshold values that can be set in N-dimensional space. Alternatively, the identification decision may be made using a decision tree or neural network. If the identification criteria are met, the process moves on to step 350, in which it is found that the one-to-one identification yielded a result of acceptance. If the identification criteria are not met, the process moves on to step 351 in which it is found that the identification yielded a negative result. In the case of one-to-one identification, the person to be identified is not accepted as the user of the system applying the fingerprint identification.

The identification method according to the invention is applicable in many different cases as it does not require a lot of memory and computing capacity. It can be used to implement various building pass systems and replace different security codes in various systems requiring identification. Such systems include various banking and payment systems, for example. Likewise, it can be used to replace PIN codes in terminals of cellular telephone systems. Application of the method in a terminal of a cellular network requires that fingerprint-reading equipment is installed in the terminal. Furthermore, part of the memory of the terminal or SIM card attached thereto has to be allocated for the software applications needed in the method according to the invention and for the files associated with the fingerprints compared as well as for the parameters computed in conjunction with the identification.

Above it was described some advantageous embodiments of the invention. The invention is not limited to the embodiments just described. For example, the method according to the invention is applicable in one-to-many identification as well. The inventional idea can be applied in numerous ways within the scope defined by the appended claims.

The invention claimed is:

1. An automatic fingerprint identification method in which a fingerprint to be identified is matched against a template stored in memory, which method comprises a phase of coarse alignment, a phase of fine alignment, and a fingerprint matching phase in which parameters describing the matching are computed and used to make a decision about the fingerprint identification, wherein the fingerprint matching phase comprises:

a step to select one ridge in the fingerprint examined and a counterpart for it in a template so that at least one of their endings meets the maximum distance condition, a step to cut the longer of one of the ridges matched to the length of the shorter one, a step to test whether the ridges matched can be made coincident by rotating one of the ridges by an angle smaller than a certain angle, a step to measure, point for point, the distance between corresponding points in the ridges, a step to test whether the point-to-point matching is in accordance with given limit values, a step to compute parameters describing the coincidence of ridges accepted as pairs and save the parameters computed, a step to check whether all possible ridge pairs have already been examined, a step to compute normalized parameters for the fingerprint examined on the basis of all ridge-specific comparisons executed, and a step to make a decision, based on the normalized parameters, as to whether or not the unknown fingerprint has been identified.

2. A method according to claim 1 wherein the coarse alignment comprises:

a step to search for reference points in the fingerprint and template matched, and a step to align the fingerprints by means of the reference points.

3. A method according to claim 2 wherein there are five or less reference points.

4. A method according to claim 2 wherein in the alignment, the fingerprint examined is transformed, without rotating it, in order to align the reference points in the fingerprints.

5. A method according to claim 4 wherein the reference points in the fingerprints matched are considered aligned if they are located not more than 50 pixels from one another if the size of the whole fingerprint pattern is 500×500 pixels.

6. A method according to claim 1 wherein that the fine alignment comprises:

a step to mutually align a minutiae pair by transforming the fingerprint examined, said minutiae pair referring to one of the following: ridge-ridge, ending-ending, bifurcation-bifurcation, a step to test the alignment of minutiae, a step to save transformation data used in the fine alignment, and a step to select a best one of transformation combinations used in the fine alignment.

7. A method according to claim 6 wherein the transformation of the fingerprint examined comprises translation and rotation of the fingerprint in a plane of examination.

8. A method according to claim 6 wherein the testing of the alignment of minutiae comprises the following tests:

endings are located within an area defined by a condition given, lengths of ridges match according to a condition given, and shapes of ridges match according to a condition given.

9. A method according to claim 8 wherein the endings are considered aligned if their difference in the fingerprints compared is less than 50 pixels if the size of the whole fingerprint is 500×500 pixels.

10. A method according to claim 8 wherein the lengths of the ridges are considered matching if their difference is not more than 10 pixels+10% of ridge length.

11. A method according to claim 8 wherein the shapes of the ridges in the fingerprints examined are considered matching if points in both ridges at distances of ¼, ½, and ¾ of the ridge *length*, measured from the endings of the *ridges*, are located at a distance of not more than 0.6* times (10 pixels+10% of ridge length) from one another.

12. A method according to claim 6 wherein the best transformation combination is a combination that produces a highest number of aligned ridge pairs in the fingerprints compared.

13. A method according to claim 1 wherein at least one set of the endings of the ridges are not more than 25 pixels apart.

14. A method according to claim 1 wherein the ridges are made parallel by rotating either ridge by 0.1 radian at the most.

15. A method according to claim 1 wherein in the point-to-point comparison of the distance of the ridges matched the ridges are considered coincident if there has not been measured a distance greater than 10 pixels+5% of ridge length.

16. A method according to claim 1 wherein for the ridge pairs that meet the ending condition, rotation condition and coincidence condition, the following parameters are computed and saved:

value of identification counter of matching minutia pairs is incremented by one, total sum of distances is computed from the difference of ridge point pairs, length of coincident ridges is computed, and weighted length is computed by dividing the squared length of coincident ridge by original total length of the ridges matched.

17. A method according to claim 1 wherein normalized parameters are computed for the fingerprint, which normalized parameters comprise:

normalized identification counter value, normalized total length of coincident ridges, normalized weighted length, and parameter for the average distance of corresponding points measured for the ridge pairs.

18. A method according to claim 17 wherein the normalized identification counter value is obtained by dividing the identification counter value by an average number of ridges found in both fingerprints.

19. A method according to claim 17 wherein the normalized total length of coincident ridges is obtained by multiplying the total length of coincident ridges by two and dividing the result by the total length of all ridges found in both fingerprints.

20. A method according to claim 17 wherein the normalized weighted length is obtained by computing the weighted lengths of individual minutiae and dividing the result by the total length of all ridges found in both fingerprints.

21. A method according to claim 17 wherein the parameter for the average distance of corresponding points measured for the ridge pairs is obtained by summing the totals of all ridge pairs that can be aligned whereafter the sum total is divided by the total length of all ridges found in both fingerprints.

22. A method according to claim 17 wherein in making an identification decision on the basis of normalized parameters, one of the following identification methods is used: threshold values set in N-dimensional space, decision tree or neural network deduction.

23. A terminal of a cellular network comprising the user identification method according to claim 1.

* * * * *